March 1, 1966  A. W. HOLLAR, JR  3,237,983
CONVERTIBLE TOP STRUCTURE
Filed Oct. 29, 1962

INVENTOR.
Arthur W. Hollar, Jr.
BY
C. C. James
ATTORNEY

United States Patent Office 3,237,983
Patented Mar. 1, 1966

3,237,983
CONVERTIBLE TOP STRUCTURE
Arthur W. Hollar, Jr., Grosse Pointe, Mich., assignor to General Motors Corporation, Detroit, Mich., a corporation of Delaware
Filed Oct. 29, 1962, Ser. No. 233,826
8 Claims. (Cl. 296—137)

This invention relates to a convertible automotive vehicle and more particularly to a foldable top structure for such a vehicle.

The invention particularly contemplates a foldable fabric top structure including front and side rail members cast of light metal. These rail members are of shallow outwardly curved tapered thickness and have outer surfaces engageable with the outer edge portions of the top fabric. A plurality of closely spaced parallel slots or grooves open on at least one of the top fabric engaging surfaces of the front rail member. Such closely spaced parallel slots are adapted to receive and retain fabric securing fasteners or nail members blindly insertable therein at random either manually or by the use of high speed production guns. Such lightweight rail members and the fabric securing means provided thereby permit the design and use of a top supporting folding structure of extremely lightweight and shallow vertical dimension yet having sufficient structural strength to properly tauten and maintain the fabric of the top structure in its closed position under high speed vehicle-in-motion wind conditions.

The foregoing and other objects, advantages and features of the invention will be apparent from the following description of several illustrative embodiments, having reference to the accompanying drawing, in which.

Figure 1:
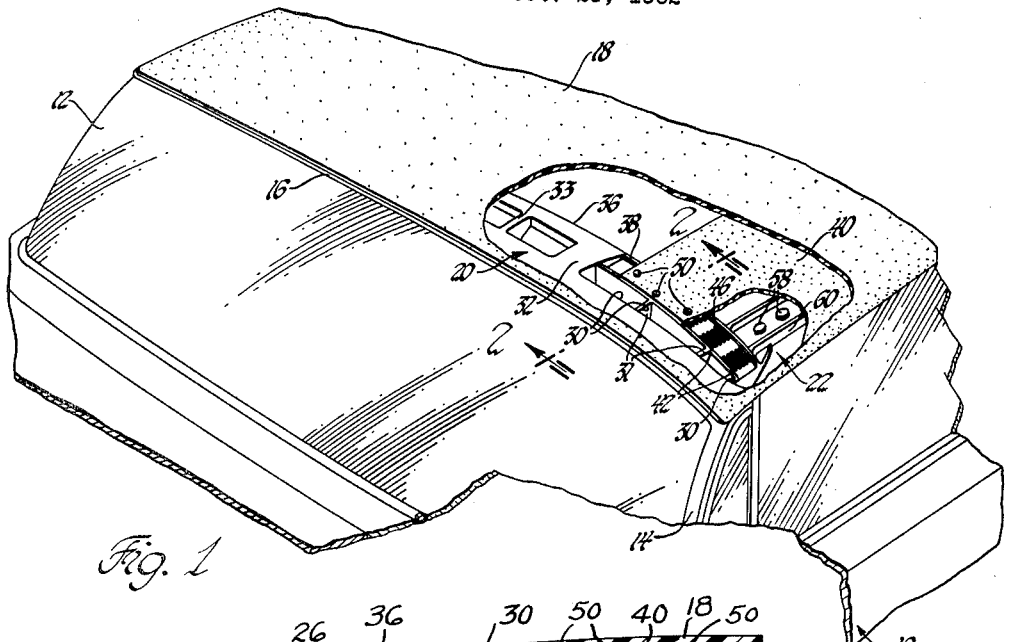
FIGURE 1 is a perspective view of a portion of a convertible automotive vehicle body with portions of the convertible top structure broken away to show lightweight metal rail members formed in accordance with the invention.

Referring more particularly to FIGURE 1, a portion of a convertible body of an automotive vehicle is indicated generally by the reference numeral 10. A windshield 12 is sealingly mounted in a conventional manner between the body 10, windshield mounting door pillars 14 (only one shown), and a windshield mounting header 16 extending transversely of the vehicle body between the front door pillars 14. A fabric top 18 is supported by a folding frame including a transverse front rail and two rearwardly extending side rail members. Adjoining portions of the front rail member and of the left side rail member are partially shown and indicated at 20 and 22 in FIGURE 1. The folding linkage of the top supporting frame is conventional and need not be shown or described in detail. For the purpose of describing the instant invention, it is sufficient that closing of the convertible top carries the front rail member 20 proximate the windshield header 16. Locking of the front rail member to the header is then effected by conventional top latching mechanisms, not shown.

The front and side rail members 20 and 22 of the illustrative embodiment are of relatively shallow vertical dimension relative to their horizontal width and are preferably die cast of a suitable lightweight high-strength metal alloy of aluminum or magnesium. In its top closed position shown in FIGURES 1 and 2, the front rail member 20 has a forward lip portion 26 extending transversely of the vehicle above the windshield header and has a second more rigid beam portion 28 extending parallel to the lip portion and spaced rearwardly therefrom by a plurality of recesses 30 defined by horizontal webs 29 and vertical webs 31, 32 and 33 extending therebetween. The forward lip portion 26 has a relatively flat fabric engaging undersurface 34 and is curved at its outer edge 35 to blend with a broadly curved fabric engaging upper surface 36 coextending between the lip portion, the vertical webs 31, 32 and 33 and the beam portion 28. This upper surface of the beam portion 28 is recessed adjacent its opposite ends, as indicated at 38, to receive the forward ends of flexible top fabric supporting underpads 40 which extend rearwardly of the top adjacent the side rail members.

In accordance with certain specific aspects of the invention, the lip portion of the front rail member 20 has a plurality of closely spaced parallel slots or grooves 44 opening downwardly on its fabric engaging undersurface 34. The opposite ends of the front rail beam portion are provided with similar grooves indicated at 42 opening to its upper recessed surface 38. As shown in the illustrative embodiment of FIGURES 1-3, the parallel grooves 42 and 44 may be spaced in groups transversely of the vehicle, longitudinally of the rail member, thus defining a plurality of spaced ribs 46 and 48 extending therebetween. The parallel grooves or slots 42 and 44 and the ribs 46 and 48 are of a depth, width and length adapted to receive and retain pronged fabric fastening members such as the nails indicated at 50 and 52. As shown, the nails 50 may be staggered and blindly inserted in the grooves 42 at random and secure the forward end of the top fabric supporting underpads 40 to the adjacent beam portion of the front rail member 20. The nails 52 may be similarly inserted in staggered random, as shown in FIGURES 2 and 3, and secure the forward edge of the fabric top 18 and a mounting flap 54 of a weather seal 56 to the undersurface of the front rail lip portion.

Figure 2:
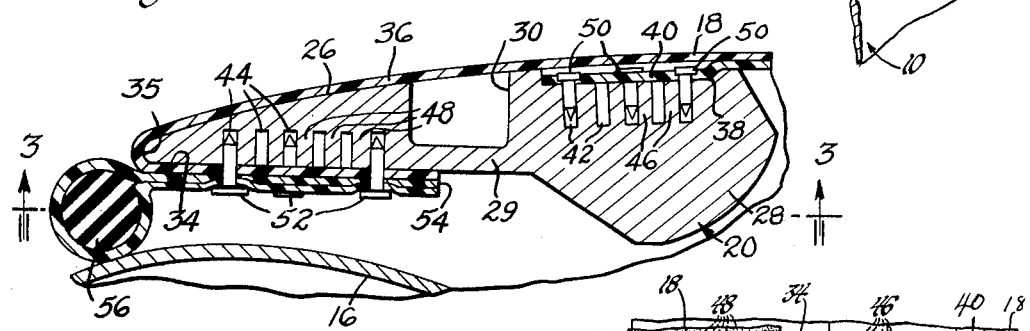
FIGURE 2 is an enlarged fragmentary sectional view taken in the direction of the arrows and in the plane of the line indicated at 2—2 of FIGURE 1.
Figure 3:
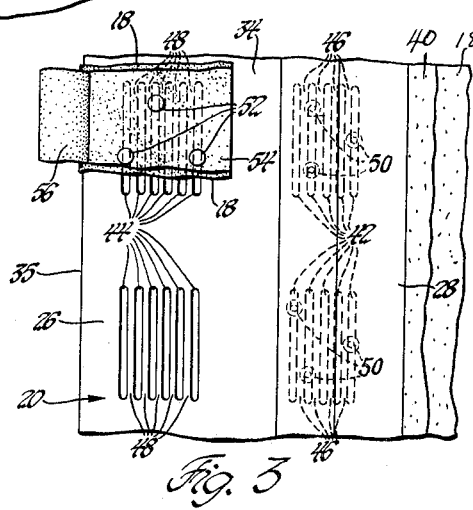
FIGURE 3 is a fragmentary view taken substantially in the direction of the arrows indicated at 3—3 of FIGURE 2 with portions of the fabric top broken away to show the front rail member of FIGURES 1 and 2 in bottom elevation.

The side rail members 22 are oppositely disposed and may be of a cross section similar to that of the front header as shown in FIGURE 2. The forward end of each side rail member is secured at 58 to a flange 60 integrally cast and projecting rearwardly at opposite ends of the front rail beam portion 28.

Figure 4:
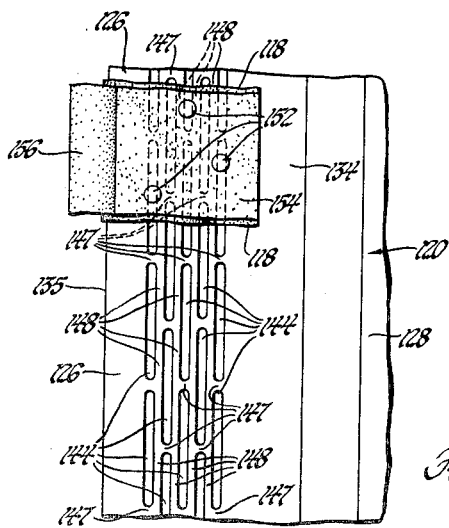
FIGURE 4 is a view similar to FIGURE 3 showing a modified or alternate spacing of the retaining slots cast in a lightweight metal nail member incorporating the invention.

In the modified form of the invention shown in FIGURE 4, the several elements are identified by reference numerals obtained by adding 100 to the reference numerals of like elements or portions of the previous embodiment. In this embodiment, however, the grooves 144 are staggered in their opening to the undersurface 134 of the front rail lip portion 126. The ribs 148 extending longitudinally therebetween are thus supported intermediate their ends by partition webs 147 separating the adjacent ends of longitudinally aligned grooves. This modification in the groove spacing limits lateral deflection of the ribs 148 thereby insuring proper relation of the top fabric securing nails 152. Such groove spacing further permits and assures the random staggered insertion of such nails in the several grooves concealed by the top fabric edges, the weatherstrip mounting strap and the roof side supporting underpad in assembly.

From the foregoing decription of several illustrative embodiments, it will be seen that the invention provides vertically thin, lightweight rail members capable of being die cast, facilitating securing the convertible top fabric thereto during manufacture, and having sufficient structructural strength to taut and maintain the convertible top fabric under high speed vehicle-in-motion wind conditions. It will be further apparent that various changes and modifications might be made in and from the disclosed structures without departing from the spirit and scope of the invention as defined in the following claims.

I claim:

1. In a foldable fabric top structure for a convertible automotive vehicle, a top securing rail member movable proximate a front windshield header when the top is actuated to a passenger compartment closing position, said rail member being cast of a suitable light metal and having a relatively shallow vertical thickness, said rail member having a shallow forward edge portion defining a relatively flat fabric engaging undersurface smoothly curved upwardly at its forward edge and coextensive with a curved fabric engaging upper surface extending rearwardly of the forward edge portion, and said forward edge portion having a plurality of closely paralleled slots spaced longitudinally of the rail member in groups opening to the fabric engaging undersurface thereof, the several groups of parallel slots each forming a plurality of parallel ribs therebetween, and said slots and ribs being dimensioned in length, width, and depth to receive and retain a plurality of top fabric securing members blindly insertable at random through the top fabric into the several slots and laterally engageable with the adjacent slot defining ribs.

2. In a foldable top structure as set forth in claim 1, said rail member having an integral beam portion extending rearwardly from and parallel to its shallow forward edge portion, said beam portion having upper surfaces formed adjacent and extending from its opposite ends and an intermediate fabric engaging upper curved surface coextensive with the top fabric engaging upper surface of the forward edge portion of the rail member and said opposite ends of the beam portion each having a plurality of spaced groups of closely paralleled slots opening to said recessed surfaces and forming relatively thin parallel ribs therebetween, and said slots and ribs in said beam portion being dimensioned in length, width and depth to receive and retain fastening members blindly insertable within the several slots and laterally engageable between the adjacent slot defining ribs to secure an adjacent end of a side top supporting underpad to each recessed upper surface of said beam portion.

3. A front rail member for a foldable top structure for a convertible automotive vehicle having a windshield mounting header extending transversely and forwardly of a passenger compartment, said rail member being cast of light metal and movable proximate the windshield mounting header when the top is actuated to a passenger compartment closing position, said rail member having a forward portion of relatively shallow vertical dimension and defining a top engaging undersurface curved smoothly coextensive at its forward edge with a top engaging upper surface extending rearwardly of said member, and said forward portion having a plurality of closely spaced parallel slots opening to its fabric engaging undersurface and forming a plurality of closely spaced ribs extending therebetween, and said slots and ribs being dimensioned in length, width and vertical depth to receive a plurality of securing members blindly insertable at random within the several slots and laterally engageable between adjacent slot defining ribs to secure the top material to the rail member.

4. A front rail member for a foldable convertible top structure as set forth in claim 3, said front rail member further having a thicker beam portion cast integrally with and extending in parallel spaced relation behind said forward portion.

5. A front rail member for a foldable convertible top structure as set forth in claim 4, said beam portion adjacent each end thereof having an upper surface slightly recessed below an intermediate top engaging upper surface coextensive with the top engaging upper surface of the forward portion of the rail member and having a plurality of closely spaced parallel slots opening to said recessed surfaces and forming a plurality of closely spaced parallel ribs extending therebetween, and said slots and ribs in said beam portion being dimensioned in length, width and vertical depth to receive fastening members blindly insertable within the several slots and laterally engageable with the adjacent slot defining ribs to secure an adjacent forward edge of a foldable top supporting underpad to each end of said beam portion.

6. In a foldable top structure for a convertible automotive vehicle, a support member having a top engaging surface thereon, said member having a plurality of closely spaced parallel slots closed on one side and opening to the fabric engaging surface and forming a plurality of closely spaced parallel ribs extending therebetween;

said parallel slots and ribs being formed in groups spaced longitudinally of the member, and said slots and ribs being dimensioned in length, width and depth to provide limited lateral deformation permitting adjacent ribs to engage and retain fastening members forcibly insertable at random into the several slots to thereby secure the top material to the member.

7. In a foldable top structure for a convertible automotive vehicle, a support member having a top engaging surface thereon, said member having a plurality of closely spaced parallel slots closed on one side and opening to the fabric engaging surface, said slots extending longitudinally of the support member and forming a plurality of closely spaced parallel ribs extending longitudinally therebetween, said slots and ribs being dimensioned in length, width and depth to receive a plurality of fastening members forcibly insertable at random within the several slots and retainable between the adjacent ribs to secure the top material to said member, and each of the closely spaced parallel slots being offset longitudinally of the member with respect to the laterally adjacent slots whereby the parallel ribs extending therebetween are laterally interconnected and supported intermediate their ends thereby limiting the lateral rib deformation accommodating and retaining the fastening members inserted therebetween.

8. A substantially solid metal member having a fabric attaching surface thereon, said member having a plurality of closely spaced parallel slots being closed at one end and opening to the fabric engaging surface and forming a plurality of closely spaced parallel ribs extending therebetween, said slots extending longitudinally of the fabric securing surface and being dimensioned in length, width and depth to receive a plurality of pronged fastening members blindly and forcibly insertable at random therein and retainable between adjacent ribs to secure fabric to said member, and each of said slots being offset longitudinally with respect to the laterally adjacent slots whereby the parallel ribs formed therebetween are laterally interconnected and supported intermediate their ends to limit lateral rib deformation accommodating and assuring rib retention of the fastening members inserted at random within the several slots.

References Cited by the Examiner

UNITED STATES PATENTS

| | | | |
|---|---|---|---|
| 2,115,224 | 4/1938 | Herron et al. | 296—137 |
| 2,549,442 | 4/1951 | Fischer et al. | 189—37 |
| 2,630,890 | 3/1953 | Macomber | 189—37 |
| 2,764,765 | 10/1956 | Woodruff | 135—6 |
| 2,924,856 | 2/1960 | Price | 50—396 |
| 3,102,613 | 9/1963 | Johnson | 189—37 X |

FOREIGN PATENTS

| | | |
|---|---|---|
| 153,866 | 4/1932 | Switzerland. |
| 843,638 | 8/1960 | Great Britain. |

A. HARRY LEVY, *Primary Examiner.*

PHILIP ARNOLD, BENJAMIN HERSH, *Examiners.*